Sept. 9, 1952 R. D. BOND ET AL 2,610,003
HOSE REEL AND COMBINED HANDLE AND SUPPORT THEREFOR
Filed Dec. 27, 1949 2 SHEETS—SHEET 1

INVENTOR
BY and Robert D. Bond
Gerard J. Hungerford,
Mason & Mason ATTORNEYS.

Sept. 9, 1952 — R. D. BOND ET AL — 2,610,003
HOSE REEL AND COMBINED HANDLE AND SUPPORT THEREFOR
Filed Dec. 27, 1949 — 2 SHEETS—SHEET 2
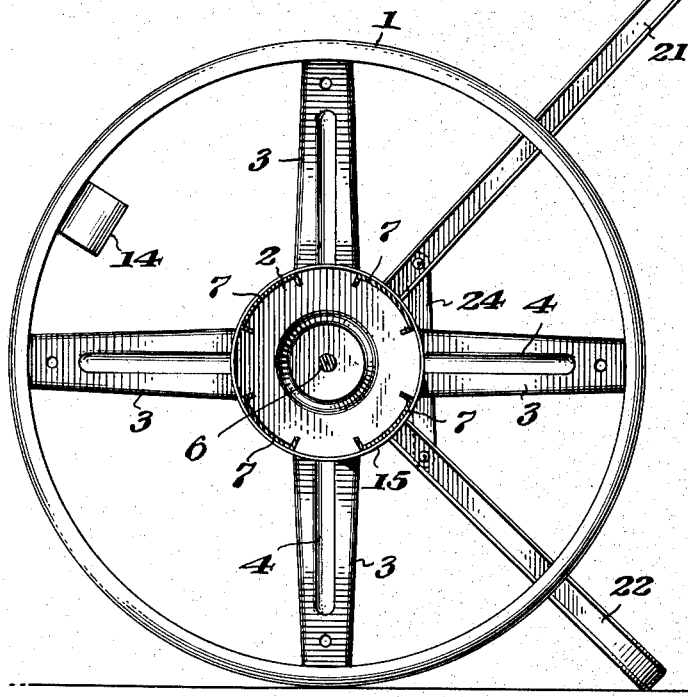
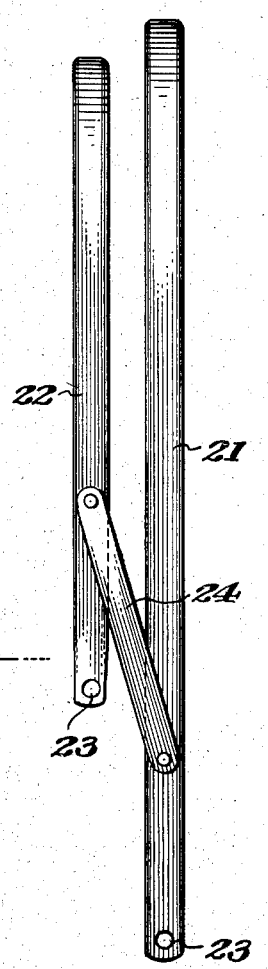
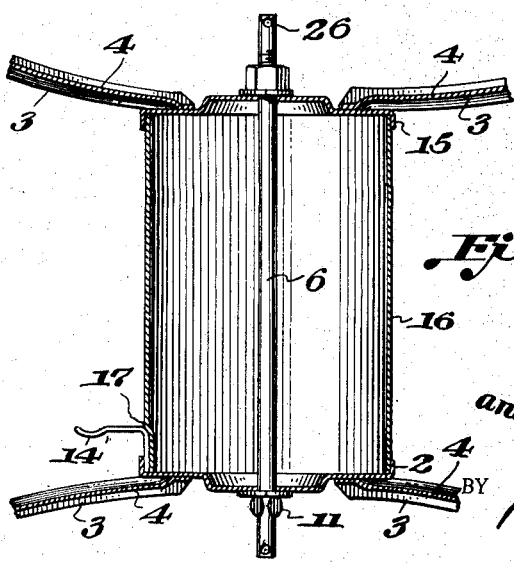
INVENTOR
Robert D. Bond
and Gerard J. Hungerford,
BY Mason & Mason
ATTORNEYS Patented Sept. 9, 1952

2,610,003

UNITED STATES PATENT OFFICE 2,610,003

HOSE REEL AND COMBINED HANDLE AND SUPPORT THEREFOR

Robert D. Bond, Detroit, and Gerard J. Hungerford, Wyandotte, Mich., assignors to Douglas Machine Products Co., Wyandotte, Mich., a corporation of Michigan Application December 27, 1949, Serial No. 135,138

3 Claims. (Cl. 242—86)

This invention relates to a hose reel of the type which may be readily moved and which is primarily used in connection with the watering of one's property.

The primary object of this invention is to provide a hose reel having a combined handle and support attached thereto whereby the reel may be pushed along a surface, may be supported thereon or held in suspension to permit free rotation thereof.

Another object of the invention is to provide a hose reel having hub-plates that are constructed in such a manner that they may be used with a rolled sleeve type drum or with separator members as the drum.

A still further object of this invention is to provide a combined handle and support for a hose reel comprising two members of different length that are rigidly spaced 90° apart when attached to the reel and are foldable when detached from the reel.

Figure 1:
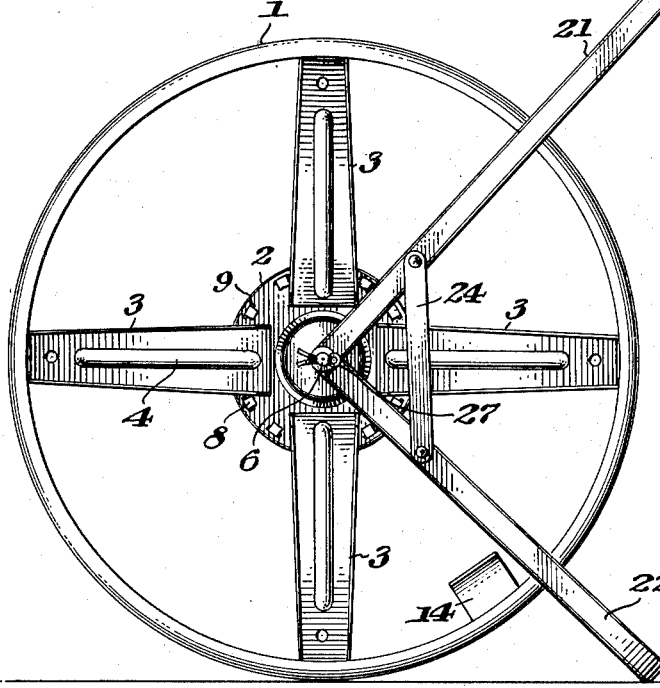
Figure 3:
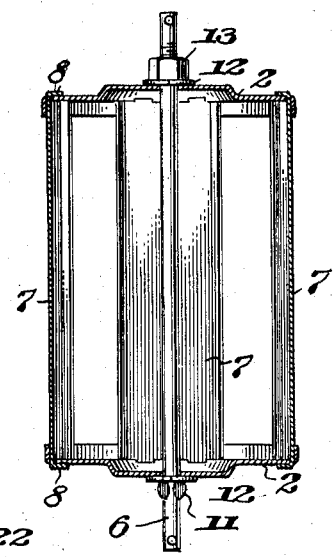
Figure 2:
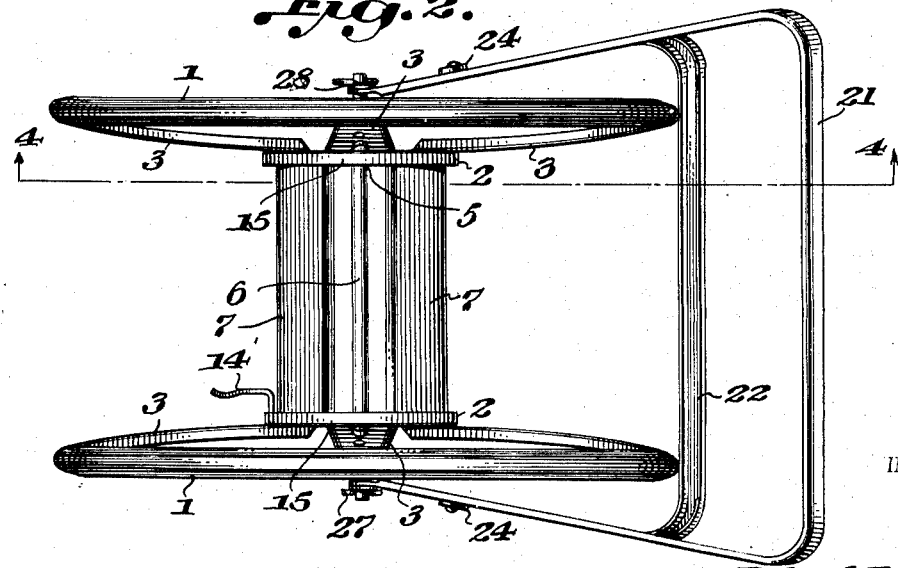

Other objects and advantages of the present invention will be apparent from the following description, reference being had to the accompanying drawings wherein like characters of reference denote corresponding parts throughout all the views, of which:

Figure 1 is an end view of the hose reel with the combined handle and support attached thereto, Figure 2 is a top plan view of the hose reel and the attached handle and support shown in Figure 1, Figure 3 is a sectional view of the attached hub-plates, separator members and axle shown in Figures 1 and 2, Figure 4 is a sectional view taken along the lines 4—4 of Figure 2, Figure 5 is a side elevational view of the combined support and handle member, and Figure 6 is a sectional view of a modified form of the attached hub-plates, a drum spacing said plates and an axle.

Referring to Figures 1 to 4 inclusive specifically, the hose reel includes a pair of wheels 1, a pair of hub-plates 2, and a plurality of spoke-like members 3 for securing a wheel 1 to its corresponding hub-plate 2. The rims of the wheels 1 are made from flat strip steel or coil steel and are turned in half-moon shape by a rolling process or other suitable means. After the rims are cut to size, they are held together by welding or riveting. It is to be understood that the type of wheels shown are merely exemplary and any other suitable wheel may be used to replace wheel 1. The spoke-like members 3 are made of sheet steel and are beaded as at 4 to provide rigidity and strength. The spoke-like members 3 are welded to the wheels 1 and, as pointed out above, thereafter welded to the wheel's corresponding hub-plate 2. Any suitable spoke-like member may be used instead of the spoke-like members 3 shown in the drawing and described above.

Each hub-plate 2 has an opening 5 therein through which an axle 6 may pass. A plurality of separator members 7 having ears 8 at each end thereof are used to properly space the hub-plates 2. The hub-plates 2 are provided with a plurality of slots 9 which are to receive the ears 8. In securing the hub-plates 2 to the separator members, it can be seen that the separator members are positioned between the hub-plates and their ears 8 are passed through the slots 9 of the hub-plates. The separators 7 are made of any suitable material such as steel and, therefore, it is possible to bend the ears 8, as shown in Figure 1 of the drawings until they firmly grasp the hub-plates 2. Such an operation securely unites the hub-plates to the separator or spacing members.

One end of the axle 6 has a flange portion 11, as shown in Figure 3 of the drawing, which is large enough so that it will not pass through the hub-plate openings 5. After the hub-plates are secured to the separator members as explained above, the axle 6 is passed through one of the hub-plates until the flange 11 abuts one of the washers 12 and thereafter the axle is securely bolted as at 13 to the hub-plates. The passing of the axle through the hub-plates further strengthens the entire reel.

It is to be noted that one of the wheels 1 is provided with a U-shaped bracketed member 14 and that a supporting member 14' is attached to one of the hub-plates 2 adjacent one of the spokes 3, the purpose of these members being hereinafter described.

The ends of the separator members 7 are covered by the edge portions 15 of each hub-plate, as shown in Figure 2 of the drawings.

Referring to Figure 6 of the drawings, a similar axle 6, hub-plates 2 and spoke members 3 are shown. Instead of having separator members 7 for spacing the hub-plates 2, this modification shows a rolled sleeve type drum 16 for spacing the hub-plates. It can be seen that each end of the drum abuts a hub-plate 2 and is overlapped by the hub-plate edges 15. The axle 6 is bolted to the hub-plates in order to properly secure the latter to the drum in a manner similar to that explained in connection with Figures 1 to 5 of the drawings. One portion of the drum 16 is bent as at 17 so that part of the supporting member 14' may be positioned and secured between the drum 16 and one hub-plate edge 15.

The conventional hose is adapted to be wound around the drum 16 or the separator members 7 in a conventional manner and when the hose is not connected to a water supply, one end of the same may be received between member 14' and the adjacent spoke 3 and the other end may be received in the bracket 14 attached to wheel in order to hold the hose in position.

Figure 5 discloses a combined handle and supporting member consisting of two pieces of steel tubing 21 and 22, the handle member 21 being greater in length than the supporting member 22. Each member is made of channel steel tubing bent to a substantially U-shape, as shown in Figure 2 of the drawings. The ends of each tubing member are provided with holes 23 and are joined together by means of bracket member 24. The axle 6 of the hose reel is provided at its ends with openings 26 and the diameter of the axle is of suitable size to permit the axle to pass through the openings 23 in the tubular members 21 and 22. In assembling the combined handle and support member on the hose reel, each end of the axle is passed through an opening 23 in the handle member and in the support member and by means of cotter pins 27 and washers 28, as shown in Figure 2 of the drawings, the handle and support member are rotatably mounted on the axle. When the handle and support member are mounted on the axle, the bracket 24 spaces the members 90° apart, as indicated in Figures 1 and 4 of the drawings. It is to be understood that members 21 and 22 may be manufactured by any suitable means such as processing the same from strip or coil steel and thereafter rolling the steel into the desired shape.

It can be seen that the user of the hose reel may freely push the reel over a ground surface by using the handle member 21, which in turn raises the supporting member 22 from the ground. If it is no longer desired to move the hose reel, the supporting member 22 may be rested on the ground surface to support the reel. Further, by placing both the handle member 21 and the supporting member 22 on a ground surface, the wheels 1 are held in suspension and allowed to revolve freely. When the reel is held in this latter position, it can be seen that the user may merely pull the hose and unreel the same from the drum 16 or separator members 7 and, at the same time, the hose reel will remain stationary.

As shown in the drawings, the combined handle and support members may be easily detached or attached to the hose reel and when they are detached they may be folded so that they are substantially parallel with one another in order to be conveniently stored or placed in a shipping carton.

The term "separator means" in the claims includes either the construction such as the separator members 7 shown in Figs. 2, 3 and 4, or the drum 16 shown in Fig. 6.

The foregoing description of the invention is explanatory thereof and various changes in the size, shape and materials, as well as in the details of the illustrated construction may be made, within the scope of the appended claims, without departing from the spirit of the invention.

We claim:

1. A hose reel and combined collapsible handle and support, said hose reel comprising an axle having an enlarged portion adjacent one end but leaving a first cylindrical extension beyond the enlarged portion, said axle having a threaded portion adjacent the opposite end but leaving a second cylindrical portion beyond the threaded portion, a pair of hub plates, said plates having central openings of a size whereby they may be mounted on said axle but preventing movement thereon beyond said axle enlarged portion, a separator means spacing said hub plates and forming a substantially cylindrical surface for winding a hose thereon, means attaching said separator means to said hub plates, a plurality of spokes welded to each of the plates on the outside portions thereof, a pair of wheels attached to said spokes; the combination of said reel with a collapsible handle and support therefor comprising two U-shaped members of different length, each member having upstanding portions and a base portion, the base portions of both members being parallel, each of said upstanding portions of each member having ends provided with apertures, and a pair of rigid members on each side of said reel pivotally connecting said U-shaped members to each other, one end of each rigid member being pivotally mounted on one of said upstanding portions of one U-shaped member and the other being pivotally mounted on an upstanding portion of the other U-shaped member on the same side of the reel whereby said U-shaped members are spaced substantially 90° from each other when they are attached to the reel, and lie substantially parallel to each other when detached from the reel with their apertures in offset relation, and means for spacing the ends of the U-shaped members from the hub plates when the U-shaped members and hub plates have been mounted on said axle, said plates having cylindrical depressed portions adjacent the periphery thereof upon which said spokes are welded whereby to avoid interference with said combined handle and support.

2. A hose reel and combined collapsible handle and support, said hose reel comprising an axle having an enlarged portion adjacent one end but leaving a first cylindrical extension beyond the enlarged portion, said axle having a threaded portion adjacent the opposite end but leaving a second cylindrical portion beyond the threaded portion, a pair of hub plates, said plates having central openings of a size whereby they may be mounted on said axle but preventing movement thereon beyond said axle enlarged portion, a separator means spacing said hub plates and forming a substantially cylindrical surface for winding a hose thereon, means attaching said separator means to said hub plates, a plurality of spokes welded to each of the plates on the outside portions thereof, a pair of wheels attached to said spokes; the combination of said reel with a collapsible handle and support therefor comprising two U-shaped members of different length, each member having upstanding portions and a base portion, the base portions of both members being parallel, each of said upstanding portions of each member having ends provided with apertures, and a pair of rigid members on each side of said reel pivotally connecting said U-shaped members to each other, one end of each rigid member being pivotally mounted on one of said upstanding portions of one U-shaped member and the other being pivotally mounted on an upstanding portion of the other U-shaped member on the same side of the reel whereby said U-shaped members are spaced substantially 90° from each other when they are attached to the reel, and lie substantially parallel to each other when detached from the reel with their apertures in offset relation, and means for spacing the ends of the U-shaped members from the hub plates when the U-shaped members and hub plates have been mounted on said axle, said plates having cylindrical depressed portions adjacent the periphery thereof upon which said spokes are welded whereby to avoid interference with said combined handle and support, said separator means comprising a plurality of separator members, said plates having a plurality of slots and said separator members having ears extending through said slots.

3. A hose reel and combined collapsible handle and support, said hose reel comprising an axle having an enlarged portion adjacent one end but leaving a first cylindrical extension beyond the enlarged portion, said axle having a threaded portion adjacent the opposite end but leaving a second cylindrical portion beyond the threaded portion, a pair of hub plates, said plates having central openings of a size whereby they may be mounted on said axle but preventing movement thereon beyond said axle enlarged portion, a separator means spacing said hub plates and forming a substantially cylindrical surface for winding a hose thereon, means attaching said separator means to said hub plates, a plurality of spokes welded to each of the plates on the outside portions thereof, a pair of wheels attached to said spokes; the combination of said reel with a collapsible handle and support therefor comprising two U-shaped members of different length, each member having upstanding portions and a base portion, the base portions of both members being parallel, each of said upstanding portions of each member having ends provided with apertures, and a pair of rigid members on each side of said reel pivotally connecting said U-shaped members to each other, one end of each rigid member being pivotally mounted on one of said upstanding portions of one U-shaped member and the other being pivotally mounted on an upstanding portion of the other U-shaped member on the same side of the reel whereby said U-shaped members are spaced substantially 90° from each other when they are attached to the reel, and lie substantially parallel to each other when detached from the reel with their apertures in offset relation, and means for spacing the ends of the U-shaped members from the hub plates when the U-shaped members and hub plates have been mounted on said axle, said plates having cylindrical depressed portions adjacent the periphery thereof upon which said spokes are welded whereby to avoid interference with said combined handle and support, said separator means comprising a drum welded on said plates.

ROBERT D. BOND.
GERARD J. HUNGERFORD.

REFERENCES CITED

The following references are of record in the file of this patent:

UNITED STATES PATENTS

| Number | Name | Date |
|---|---|---|
| 818,990 | Wirt et al. | Apr. 24, 1906 |
| 918,180 | Mayor | Apr. 13, 1909 |
| 1,137,079 | Otto | Apr. 27, 1915 |
| 1,267,741 | Buck | May 28, 1918 |
| 1,648,568 | Stoffel | Nov. 8, 1927 |
| 1,652,718 | Huntington | Dec. 13, 1927 |
| 1,819,707 | German | Aug. 18, 1931 |
| 1,835,366 | Atwood | Dec. 8, 1931 |
| 1,845,590 | Edwards | Feb. 16, 1932 |
| 1,869,408 | Bungay | Aug. 2, 1932 |
| 2,149,631 | Rodda | Mar. 7, 1939 |
| 2,441,437 | Morrone | May 11, 1948 |